S. F. COWLES.
Milk-Coolers.
No. 136,215.  Patented Feb. 25, 1873.
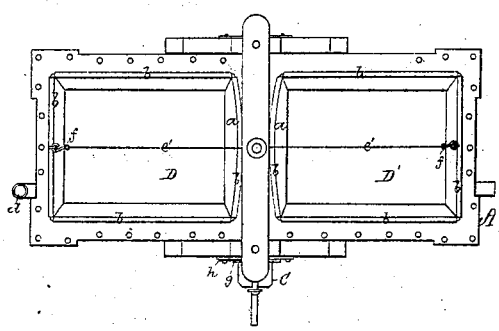
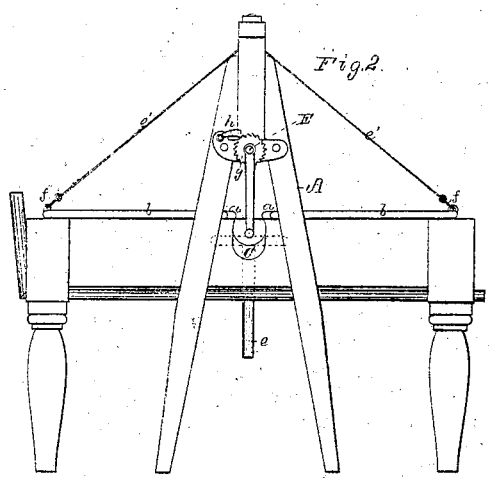 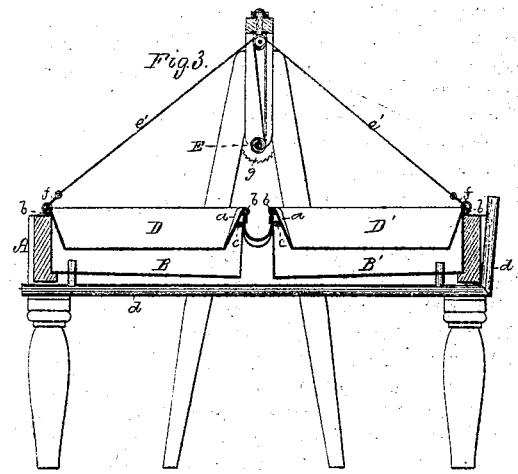
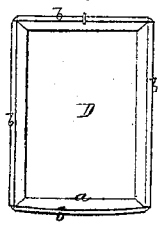 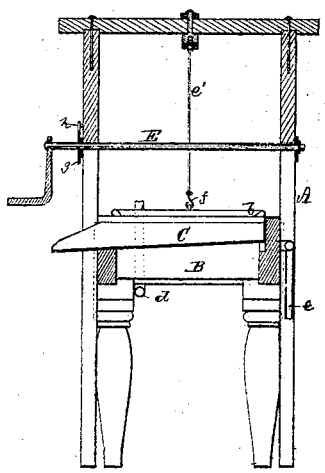 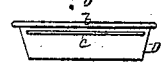
Witnesses
S. N. Piper
L. N. Potter
Seth F. Cowles
by his attorney
R. H. Eddy

UNITED STATES PATENT OFFICE.

SETH F. COWLES, OF COVENTRY, VERMONT.

IMPROVEMENT IN MILK-COOLERS.

Specification forming part of Letters Patent No. 136,215, dated February 25, 1873.

*To all whom it may concern:*

Be it known that I, SETH F. COWLES, of Coventry, of the county of Orleans and State of Vermont, have invented a new and useful Improvement in Apparatus for Preserving and Cooling Milk; and do hereby declare the same to be fully described in the following specification and represented in the accompanying drawing, of which—

Figure 1 is a top view, Fig. 2 an elevation, Fig. 3 a longitudinal section, and Fig. 4 a transverse section. Fig. 5 is a top view, and Fig. 6 a front-end view of one of the movable pans.

In such drawing, A denotes a frame supporting two stationary reservoirs, B B', having between them a discharging-spout, C, which is arranged transversely of the frame. Within each of such reservoirs there is placed a pan or shallow vessel, D or D', whose inner end $a$ is curved or arched, as shown, for the better discharge of milk into the spout. The said pan has a lip, $b$, projecting from and around its upper edge for supporting the pan on the upper edge of the reservoir. Besides the said lip there projects from the inner end of each pan, and just below the lip, another or auxiliary lip, $c$, whose purpose is to support the pan on the edge of the reservoir, or preventing it from slipping off such while the pan may be in the act of being inclined for discharging its contents into the spout. A conduit, $d$, suitably arranged, is to supply the reservoirs with cool water, each reservoir having an exit-pipe, $e$, for the escape of the surplus water. Furthermore, over the spout and in the frame A is a shaft or windlass, E, provided with a line, $e'$, having a hook, $f$, at its end for connecting it to the outer end of either pan. There is to such shaft a ratchet-wheel, $g$, provided with a retaining-pawl, $h$, which is pivoted to the frame. The object of the ratchet-wheel and the pawl is to retain the pan at any desirable inclination for draining its contents into the spout.

When it may be desirable to discharge the milk from either pan, such may be accomplished by raising the pan at its outer end so as to cause the contents to flow into the spout, from which they may be discharged into a suitable receiver.

I claim—

1. The combination of the two cooling-reservoirs B B' and the spout C, arranged as described, and their combination with the two milk-pans D D', the receivers being provided with the induction and eduction pipes, as set forth.

2. The combination of the windlass or shaft E and its line $e'$ with the reservoirs B B', spout C, and pans D D', all being arranged together and in the frame A, as set forth.

3. The milk-pan, made with the curved or arched end, as specified.

4. The milk-pan, as made with the main and auxiliary flanges or lips $b$ $c$, arranged as set forth.

SETH F. COWLES.

Witnesses:
 JOHN W. MUSSY,
 HEMAN G. WHITE.